United States Patent Office 3,723,145
Patented Mar. 27, 1973

3,723,145
WELL CEMENTING COMPOSITIONS
AND METHOD
Walter J. Haldas and Jesse A. Faust, Houston, Tex.,
assignors to Lone Star Cement Corporation, Houston,
Tex.
No Drawing. Filed Apr. 5, 1971, Ser. No. 131,514
Int. Cl. C04b 7/02
U.S. Cl. 106—90
15 Claims

ABSTRACT OF THE DISCLOSURE

An additive composition for enhancing the properties of cement compositions, and cement composition of enhanced properties, particularly useful in the cementing of wells, and methods of cementing geologic formations traversed by well bores are disclosed. The additive composition comprises a water soluble lignosulfonate or lignosulfonic acid or mixtures thereof, tartaric acid or a salt of tartaric acid or mixtures thereof and sodium naphthalene sulfonate, and preferably about 3 parts calcium lignosulfonate, one part tartaric acid and four parts sodium naphthalene sulfonate, although good results are obtained with 1 to 19 parts lignosulfonate or lignosulfonic acid and 19 to 1 parts tartaric acid or a salt of tartaric acid admixed with 1 to 19 parts of sodium naphthalene sulfonate. The cement composition includes a hydraulic cement and preferably about 2% of the additive composition based on the weight of the cement; although, good results are obtained with from about 0.30% to about 5.00%. Especially good results are obtained when the hydraulic cement has been pretreated and aged as in our copending application filed Jan. 25, 1971, Ser. No. 109,606. The cement composition has good initial viscosity and strength, ideal thickening times, and a reduced amount of mix water may be used thereby increasing the weight of the cement slurry to about eighteen pounds per gallon without using weight materials.

---

The method of performing cementing operations in geologic formations comprises introducing a slurry of the cement composition in a well, positioning the cement slurry at cementing depth for bonding and plugging purposes, and allowing the cement slury to harden.

A number of examples are set forth disclosing the additive and cement compositions, methods of making and using them.

BACKGROUND OF THE INVENTION

The cement composition of this invention has special utility in cementing geologic formations traversed by well bores, such as in the drilling of oil and gas wells. Accordingly, the invention is described in connection with such cementing operations; although, other uses of the invention may be made.

There has been a need for a cement composition that can be used to cement wells drilled from the surface to depths beyond 16,000 feet in search of oil and gas. Such a cement composition ideally should have a thickening time of at least about 3 hours at any specified depth, ample development, low initial slurry viscosity or consistency, should be compatible with sea water, as a great many wells are cemented offshore where it is advantageous to use sea water as mix water (such as in the Gulf of Mexico), and should have good slurry density without requiring the use of weight materials, although it should be compatible with weight materials so that they may be used, if desired.

The present invention is directed to such a cement composition and method.

The inventors are not aware of any prior patents or publications disclosing, or the use of, the cement compositions and methods of the present invention. Calcium lignosulfonate, tartaric acid and sodium naphthalene sulfonate separately are known retarders, but to the knowledge of the inventors these have not been combined in accordance with the present invention, which combination provides unexpectedly good results and particularly when combined with the "basic" cement of our co-pending application Ser. No. 109,606, which is an important aspect of the present invention. U.S. Pat. No. 2,880,102 granted Mar. 31, 1959, discloses an oil well cement composed of a hydraulic cement, a colloidal clay, a salt of tartaric acid used for the purpose of and in an amount to retard the swelling of the colloidal clay, and calcium lignosulfonate. Other U.S. patents disclose retarders utilizing tartaric acid, lignosulfonate or sodium naphthalene sulfonate.

SUMMARY

The present invention relates to a cement additive which enhances the properties of cement compositions and to cement compositions and slurries of enhanced properties particularly useful in the cementing of oil wells, and to methods of cementing geologic formations traversed by well bores in which the cement slurries have good initial viscosity and strength, ideal thickening times and permits a reduced amount of mix water to be used thereby increasing the weight of the cement slurries to about eighteen pounds per gallon without the use of weight materials.

Accordingly, it is an object of the present invention to provide a cement composition having enhanced an improved properties.

It is a further object of the present invention to provide an additive composition for cement compositions and to cement compositions which imparts enhanced and improved properties for the slurries.

A further object of the invention is the provision of a retarder for use with cement slurries used in cementing oil, gas and other wells which provide ideal thickening times at depths down to and beyond 20,000 feet.

A further object of the present invention is the provision of an additive composition for cement compositions and to cement compositions, which when used as cement slurries for cementing formations traversed by a well bore, has a thickening time of at least about three hours, or, preferably from about 3 to 4 hours, at depths down to and beyond 20,000 feet, has ample strength development, and low initial viscosity.

A further object of the present invention is the provision of an additive composition for cement compositions and to cement compositions which when used as slurries permits the use of less mix water, which has a slurry weight of at least about 18 pounds per gallon, has low initial viscosity and the other enhanced properties previously set forth.

A further object of the present invention is the provision of such a retarder composition for use in and of cement compositions including the retarder composition which is compatible with sea water so that in drilling offshore wells, sea water may be used as the mix water thereby eliminating the expense and trouble of providing "fresh" water as the mix water.

A further object of the present invention is the provision of a method of cementing formations traversed by a well bore utilizing cement compositions of the invention.

A further object of the present invention is the provision of a cement slurry having low initial viscosity, good strength, ideal thickening times at depths down to and exceeding 20,000 feet, a slurry weight of at least 18 pounds per gallon and to a method of cementing formations traversed by a well with the cement slurry.

Other and further objects, features and advantages will be apparent from the following description of presently-preferred embodiments of the invention.

DESCRIPTION OF THE PREFERRED EMBODIMENTS

The additive composition of the present invention may be used as a retarder in cement slurries for cementing geologic formations at depths down to and exceeding 20,000 feet, particularly when used with the "basic" cement of our co-pending application, as previously mentioned, although it is useful with all inorganic type cements. This additive composition comprises a water soluble lignosulfonate, preferably calcium lignosulfonate or lignosulfonic acid or mixtures thereof, tartaric acid or a salt of tartaric acid or mixtures thereof, and sodium naphthalene sulfonate, and preferably 3 parts calcuim lignosulfonate, 1 part tartaric acid and four parts sodium naphthalene sulfonate, although good results are obtained with 1–19 parts of lignosulfonate or lignosulfonic acid or mixtures thereof and 19–1 parts tartaric acid or a salt of tartaric acid or mixtures thereof admixed with 1–19 parts sodium naphthalene sulfonate. Especially good results are obtained when the hydraulic cement has been pretreated and aged as in our co-pending application, previously identified. The preferred amount of the retarder composition added is about 2% based upon the weight of the cement; although about .30% to about 5.00% may be used. The resulting cement composition when slurried has good initial viscosity and strength, ideal thickening times and a reduced amount of mix water may be used thereby increasing the weight of the cement slurry to the order of about eighteen pounds per gallon without the use and expense of weight materials, although the slurry is compatible with weight materials which may be used, if desired.

The present invention is applicable to all cementitious systems comprising hydraulic cement. The term "hydraulic cement" is recognized in the art as defining a definite class and it is intended to cover all members of this class. Hydraulic cements include, but are not limited to, the portland cements, the natural cements, the white cements, the aluminous cements, the grappier cements, the hydraulic limes and the pozzolanic cements including those derived from industrial slags. The hydraulic cement which is most widely used, because of its amenability to low cost production, is portland cement.

Especially good results have been obtained by using the "basic" cement of our co-pending application, as previously mentioned. This "basic" cement composition, which has excellent compatibility with the retarder composition of this invention comprises an inorganic cement, as the term is employed herein, intimately mixed with a small amount of water, from about 0.25% up to about 5% by weight of the cement, and preferably from about 0.5% to about 1% water by weight, and aged or cured for at least 30 minutes. The amount of water added should not provide substantial lumping, and if the higher amounts of water are used, preferably a cement slurry including the "basic" cement composition should be made and used promptly after aging or curing since the higher amounts of water addition increase the thickening time of the cement with storage. The use of about 0.5% water minimizes these disadvantages and permits attainment of ideal thickening times particularly with the retarder composition of the present invention.

In addition to the retarder composition of the present invention, various additives used in the cementing of oil wells may be used and added to the cement slurry, such as those listed on pp. 18, 19 and 20 of the November-December 1963 issue of Petroleum Equipment published by Special Associated Publishers, Inc.

The water soluble lignosulfonates include calcium lignosulfonate, ferro lignosulfonate, potassium lignosulfonate, ferro chrome lignosulfonate, sodium lignosulfonate, magnesium lignosulfonate, ammonium lignosulfonate and lithium lignosulfonate. Also as previously mentioned, lignosulfonic acid may be used, and mixtures of the salts of lignosulfonate with each other and with lignosulfonic acid may be used.

The salts of tartaric acid include, calcium tartrate, sodium tartrate, potassium tartrate, ammonium tartrate, sodium potassium tartrate, lithium tartrate and potassium bitartrate and as previously mentioned, tartaric acid may be used, and mixtures of the salts of tartaric acid with each other and with tartaric acid may be used.

The method of making the retarder composition of the present invention comprises mixing the components together within the ranges set forth. The retarder composition is then mixed with inorganic cement in the ranges set forth. Any desired types of mixing can be used which will allow intimate blending of the various components. If desired the cement and retarder and such other additives as may be desired can be premixed and simply slurried at the well site.

A cement slurry is then made by mixing the inorganic cement with the retarder composition with water. Any desired amount of mix water may be used, and advantageously, less mix water may be used than that normally used in conventional cements. Ordinarily, the mix water will be in the range as specified in API Std. 10A. However, when using the retarder composition with or without the "basic" cement, the mix water can be reduced approximately 29 to 32% depending on the particular cement used. As previously mentioned, the mix water may be "fresh" or sea water. Other additives are added to the cement slurry as desired.

The following examples and tables are illustrative of the invention in which API Casing or Squeeze Schedules were used (as specified in API RP 10B), the retarders were based on the weight, and the amount of retarder composition added to the cement was based on the weight of the dry cement.

EXAMPLE I

In this example, a retarder consisting of 4 parts sodium naphthalene sulfonate, 3 parts calcium lignosulfonate and 1 part tartaric acid was admixed with an API Class H cement and 26% water to form a cement slurry. The amounts of the retarder composition were varied as set forth in the following Table I in which API Casing and API Squeeze Schedules were used.

TABLE I

[Thickening time of API Class H cement retarder consisting of 4 parts sodium naphthalene sulfonate, 3 parts calcium lignosulfonate and 1 part tartaric acid—26.0% mix water]

API Casing Schedules

| Percent retarder | 8,000 ft. | 10,000 ft. | 12,000 ft. | 14,000 ft. | 16,000 ft. | 18,000 ft. | 20,000 ft. |
|---|---|---|---|---|---|---|---|
| 0.40 | (15) 1:05 | | | | | | |
| 0.45 | (22) 1:35 | | | | | | |
| 0.50 | (17) 4:10 | (18) 2:00 | (12) 1:15 | (5) 0:50 | | | |
| 0.55 | | | (16) 1:30 | (12) 3:25 | (12) 2:15 | | |
| 0.60 | | (22) 2:30 | (12) 3:35 | –(12) 3:45 | (7) 2:40 | | |
| 0.65 | | (14) 3:30 | | | (11) 4:20 | | |
| 0.70 | | | | | | (20) 1:40 | |
| 0.80 | | | | | | (9) 2:30 | |
| 0.85 | | | | | | (9) 3:15 | |
| 1.60 | | | | | | | (8) 3:10 |
| 1.80 | | | | | | | (14) 3:15 |
| 2.00 | | | | | | | (16) 3:45 |

API Squeeze Schedules

| | 8,000 ft. | 10,000 ft. | 12,000 ft. | 14,000 ft. | 16,000 ft. | 18,000 ft. | 20,000 ft. |
|---|---|---|---|---|---|---|---|
| 0.50 | (15) 0:40 | (10) 2:35 | (7) 2:20 | (12) 1:30 | (17) 1:05 | | |
| 0.60 | (10) 1:50 | (13) 5:10 | (6) 4:30 | (8) 2:25 | | | |
| 0.70 | (8) 3:50 | | | (9) 5:00 | | | |
| 0.80 | | | | | (16) 4:10 | (20) 2:00 | |
| 0.90 | | | | | (19) 5:40 | | |
| 1.10 | | | | | (16) 9:40 | | |
| 1.20 | | | | | | (16) 4:20 | |
| 1.60 | | | | | | (16) 6:4 l | |

NOTE: Thickening time to 70 units of consistency or viscosity, numbers in parenthesis denote initial consistency.

From the foregoing Table I, it is seen that good thickening times were obtained beginning at 0.50 retarder composition with relatively low (26%) mix water. Normally 38% mix water would be used with the Class H cement.

EXAMPLE II

In this example, the same retarder composition, cement, and amount of mix water were used as in Example I, to form a cement slurry except that the amount of sodium naphthalene sulfonate was varied with respect to the mixture of 3 parts calcium lignosulfonate and 1 part tartaric acid as shown in the following Table II.

TABLE II

[Thickening time of API Class H cement with retarder consisting of varying ratio of sodium naphthalene sulfonate to a mixture comprised of 3 parts calcium lignosulfonate to 1 part tartaric acid—26% Mix Water]

| Parts sodium naphthalene sulfonate | Parts mixture | Percent retarder | API Squeeze Schedules | |
|---|---|---|---|---|
| | | | 12,000 ft. | 18,000 ft. |
| 19 | 1 | 1.40 | (12) 2:05 | |
| | | 1.60 | (7) 2:20 | |
| | | 2.00 | (16) 2:40 | |
| 3 | 1 | 0.90 | (14) 2:55 | |
| | | 1.00 | (9) 7:30+ | |
| | | 1.20 | | (14) 1:30 |
| | | 2:20 | | (16) 1:55 |
| | | 3:00 | | (8) 3:20 |
| 1 | 1 | 0.50 | (17) 3:10 | |
| | | 0.80 | | (9) 2:15 |
| | | 1.00 | | (15) 4:30 |
| | | 1.20 | | (12) 5:35 |
| 1 | 3 | 0.30 | (12) 1:40 | |
| | | 0.40 | (13) 4:30 | |
| | | 0.50 | (13) 6:15 | |
| | | 0.70 | | (12) 2:25 |
| | | 0.80 | | (16) 3:05 |
| 1 | 19 | 0.25 | (18) 0:45 | |
| | | 0.30 | (16) 1:45 | |
| | | 0.35 | (9) 3:10 | |
| | | 0.70 | | (12) 2:10 |
| | | 0.80 | | (20) 2:50 |
| | | 0.90 | | (12) 3:20 |

NOTE: Thickening time to 70 units of consistency or viscosity, numbers in parenthesis denote initial consistency.

From the foregoing Table II, it is seen that good results are obtained when varying the ratio from 1 to 19 parts of the mixture of 3 parts calcium lignosulfonate and 1 part tartaric acid to 19 to 1 parts of soidum naphthalene sulfonate.

EXAMPLE III

In this example, the retarder composition, cement and amount of mix water were the same as in Example 1, except that sea water was substituted for "fresh" water. The amount of the retarder composition was varied and API Squeeze Schedules were run with the results as set forth in the following Table III.

TABLE III

[Thickening time of API Class H cement retarder consisting of 4 parts sodium naphthalene sulfonate, 3 parts calcium lignosulfonate and 1 part tartaric acid—26.0% mix water (sea water)]

| | API Squeeze Schedules | | |
|---|---|---|---|
| Percent retarder | 14,000 ft. | 16,000 ft. | 18,000 ft. |
| 0.60 | (18) 0:45 | (8) 1:03 | |
| 0.70 | (8) 3:00 | | |
| 0.80 | (10) 6:00+ | (11) 4:18 | (13) 1:23 |
| 1.00 | | (8) 5:30+ | (12) 1:27 |
| 1.20 | | | (14) 3:27 |

NOTE: Thickening time to 70 units of consistency or viscosity, numbers in parenthesis denote initial consistency.

From the foregoing Table III, it is seen that the retarder composition is compatible with sea water, and good thickening times were obtained.

EXAMPLE IV

In this example, the retarder composition of Example I was used with an API Class A cement mixed with 32% mix water and with an API Class C cement mixed with 40% mix water. The amount of the retarder composition was varied and the results of the API Squeeze Schedules are set forth in the following Table IV.

TABLE IV

[Thickening time of API Class A cement and Class C cement with retarder consisting of 4 parts sodium naphthalene, 3 parts calcium lignosulfonate and 1 part tartaric acid]

API Class A cement (32.0% mix water)

API Squeeze Schedules

| Percent retarder | 14,000 ft. | 16,000 ft. | 18,000 ft. |
|---|---|---|---|
| 1.10 | (5) 3:29 | | |
| 1.40 | | (5) 4:28 | |
| 1.80 | | | (10) 2:00 |
| 2.00 | | | (12) 4:10 |

API Class C cement (40.0% mix water)

API Squeeze Schedules

| | 14,000 ft. | 16,000 ft. | 18,000 ft. |
|---|---|---|---|
| 1.00 | – 0:18 | | |
| 1.20 | (5) 1:14 | | |
| 1.30 | (5) 4:05 | | |
| 1.50 | | (5) 3:30 | |
| 1.60 | | (5) 5:00+ | |
| 1.70 | | | (5) 1:58 |
| 1.80 | | | (5) 2:52 |

NOTE: Thickening time to 70 units of consistency, numbers in parenthesis denote initial consistency or viscosity.

From the foregoing Table IV, it is seen that good results were obtained by using various amounts of the retarder composition at various depths with API Class A and C cements. Also, reduced amounts of mix water were used since normally 46% mix water is used with a Class A cement and 56% mix water is used with a Class C cement.

EXAMPLE V

In this example, an API Class H cement pretreated with 0.50% of water and aged for at least 30 minutes was used in place of the cement in Example I. The results of the standard API Casing and Squeeze Schedules are set forth in the following Table V.

TABLE V

[Thickening time of API Class H cement pretreated with 0.50% water with retarder consisting of a mixture of 4 parts sodium naphthalene sulfonate, 3 parts calcium lignosulfonate and 1 part tartaric acid—26% mix water]

| Percent retarder | API Casing Schedules | | | | | | |
|---|---|---|---|---|---|---|---|
| | 8,000 ft. | 10,000 ft. | 12,000 ft. | 14,000 ft. | 16,000 ft. | 18,000 ft. | 20,000 ft. |
| 0.25 | | | | (15) 0:55 | | | |
| 0.30 | (23) 1:40 | (18) 2:35 | (19) 2:45 | (15) 3:40 | (14) 1:40 | | |
| 0.35 | (15) 3:20 | | (14) 6:20 | | (14) 3:35 | | |
| 0.40 | (17) 4:00 | (15) 6:00 | | | (14) 4:15 | | |
| 0.60 | | | | | | (16) 1:40 | |
| 0.80 | | | | | | (16) 2:30 | |
| 1.00 | | | | | | (25) 4:40 | |
| 1.40 | | | | | | | (13) 2:40 |
| 1.60 | | | | | | | (17) 2:50 |
| 1.80 | | | | | | | (5) 3:20 |

| | API Squeeze Schedules | | | | | | |
|---|---|---|---|---|---|---|---|
| 0.20 | (28) 1:00 | (16) 1:00 | (19) 0:45 | | | | |
| 0.25 | (16) 1:25 | (16) 2:15 | (16) 1:10 | (15) 1:20 | | | |
| 0.30 | (15) 3:10 | (7) 4:20 | (14) 4:15 | (16) 2:45 | | | |
| 0.35 | | | | (14) 3:45 | | | |
| 0.40 | | | | | (5) 2:30 | | |
| 0.50 | | | | | (10) 3:10 | | |
| 0.60 | | | | | (12) 4:10 | | |
| 0.80 | | | | | | (17) 1:55 | |
| 0.90 | | | | | | (12) 3:10 | |
| 1.00 | | | | | | (20) 4:10 | |

NOTE: Thickening time to 70 units of consistency, numbers in parenthesis denote initial consistency or viscosity, percent retarder based on weight of cement.

From the foregoing Table V it is seen that good thickening times were obtained at various depths and at quite deep depths. Also, that good thickening times are obtained with as little as 0.30% retarder composition for certain conditions and depths.

EXAMPLE VI

In this example, the retarder, cement and 26% mix water were used to form a cement slurry as in Example I and sodium lignosulfonate and ferro chrome lignosulfonate were each substituted for calcium lignosulfonate. The amounts of the retarder composition and results obtained were as set forth in the following Table VI.

TABLE VI

[Thickening time of Class H cement with retarder consisting of 4 parts sodium naphthalene sulfonate, 3 parts lignosulfonic acid salts and 1 part tartaric acid—26% mix water]

| Lignosulfonic acid salt | Percent retarder | 12,000 ft. | 18,000 ft. |
|---|---|---|---|
| Calcium | 0.50 | (7) 2:20 | |
| | 0.60 | (6) 4:30 | |
| | 0.80 | | (20) 2:00 |
| | 1.20 | | (16) 4:20 |
| | 1.60 | | (16) 6:45 |
| Sodium | 0.50 | (13) 1:05 | |
| | 0.60 | (6) 2:40 | |
| | 0.70 | (6) 4:15 | |
| | 1.30 | | (20) 1:45 |
| | 1.60 | | (19) 2:30 |
| | 2.00 | | (10) 4:50 |
| Ferro chrome | 0.50 | 0:25 | |
| | 0.60 | (6) 2:15 | |
| | 0.70 | (10) 3:15 | |
| | 1.50 | | (8) 1:20 |
| | 2.00 | | (13) 2:10 |
| | 2.40 | | (14) 3:20 |

NOTE: Thickening time to 70 units of consistency, numbers in parenthesis denote initial consistency or viscosity.

From the foregoing Table VI, it is seen that various lignosulfonates may be utilized with good results.

EXAMPLE VII

In the foregoing examples, standard API Casing and Squeeze Schedules were used. In this example, the same retarder composition, cement and 26% mix water were used as in Example I, and the temperatures were increased to simulate conditions at greater depths. The results are set forth in the following Table VII.

TABLE VII

[Thickening time of Class H cement with retarder consisting of 4 parts of sodium naphthalene sulfonate, 3 parts calcium lignosulfonate and 1 part tartaric acid—26% mix water]

Percent retarder

Test Run at 360° F. and 18,000 p.s.i.: [1]
   (18) 3:25 _____ 2.50
Test Run at 380° F. and 18,000 p.s.i.: [1]
   (16) 2:45 _____ 3.00
   (17) 3:00 _____ 3.30
Test Run at 400° F. and 18,000 p.s.i.: [1]
   (14) 2:47 _____ 4.50

[1] Temperature and pressure brought up in 90 minutes.

NOTE: Thickening time to 70 units of consistency, numbers in parenthesis denote initial consistency or viscosity.

From Table VII it is seen that higher amounts of the retarder composition can be used at quite deep depths with satisfactory results. Higher amounts of the retarder composition may be used, particularly, for long life slurries where longer setting times are desired.

Other of the water soluble lignosulfonates or lignosulfonic acid or mixtures thereof and other of the tartrates or tartaric acid or mixtures thereof may be substituted in the foregoing examples and tables with good results. Also, the amounts thereof may be varied from 1 to 19 parts and 19 to 1 parts, respectively, with good results. Also, "fresh" or sea water may be used and any of the hydraulic cements may be used in the various examples and tables. The optimum amounts of the components of the retarder composition and the optimum amount of a particular retarder composition to be added to a particular cement with either "fresh" or sea water for the particular well conditions and results desired may be determined readily by simple experimentation. Accordingly, in order not to unduly lengthen the description no more examples are deemed necessary or are given.

In cementing wells in accordance with the invention, the retarder composition is admixed with the desired hydraulic cement in the proportions set forth and then the cement and retarder are admixed with water, although the retarder composition may be added to the cement and water mixture or may be added to the water and then the water with the retarder added admixed with the cement. The amount of water will depend upon the particular cement used. The cement slurry thus formed is then introduced into the well and pumped down the well into the space to be cemented until the cement sets. The retarder composition may be prepared at or near the well sit, if desired, or may be previously prepared and added to the cement, cement-water mix, or water at the well site, or the cement and retarder may be premixed and simply slurried at the well site, as desired. Advantageously, however, the retarder composition may be added to the hydraulic cement and admixed therewith well in advance and then mixed with additional additives and desired amounts of mix water to form the cement slurry.

Accordingly, the present invention is well adapted and suited to attain the objects and ends and has the advantages and features mentioned as well as others inherent therein.

While presently-preferred embodiments and examples have been given for the purpose of diclosure, many changes may be made therein and the invention may be applied to additional uses which are within the spirit of the invention as defined by the scope of the appended claims.

What is claimed is:

1. A composition consisting essentially of
   about 1 part to about 19 parts by weight of a mixture of about 1 part to about 19 parts of a member selected from the group consisting of a water soluble lignosulfonate, lignosulfonic acid and mixtures thereof, and
   from about 1 part to about 19 parts by weight of a member selected from the group consisting of tartaric acid, a salt of tartaric acid and mixtures thereof, and
   from about 19 parts to 1 part by weight of sodium naphthalene sulfonate.

2. The composition of claim 1 where the lignosulfonate is calcium lignosulfonate.

3. The composition of claim 2 where the mixture includes about 3 parts calcium lignosulfonate, about 1 part tartaric acid, and about 4 parts sodium naphthalene sulfonate.

4. A cement composition consisting essentially of
   a hydraulic cement, and
   about 0.30% to about 5.00% of the composition of claim 1 based on the dry weight of the cement.

5. A cement composition consisting essentially of
   a hydraulic cement, and
   about 0.30% to about 5.00% of the composition of claim 2 based on the dry weight of the cement.

6. A cement composition consisting essentially of:
   a hydraulic cement, and
   about 0.30% to about 5.00% of the composition of claim 2 based on the dry weight of the cement.

7. A cement composition consisting essentially of:
   a substantially dry hydraulic cement free of substantial lumping intimately mixed with a small amount of water and aged for a period of at least 30 minutes, and
   from about 0.30% to about 5.00% of the composition of claim 1 based on the dry weight of the cement.

8. A cement composition consisting essentially of:
   a substantially dry hydraulic cement free of substantial lumping intimately mixed with a small amount of water and aged for a period of at least about 30 minutes, and
   from about 0.30% to about 5.00% of the composition of claim 2 based on the dry weight of the cement.

9. A cement composition consisting essentially of:
   a substantially dry inorganic cement free of substantial lumping intimately mixed with a small amount of water and aged for a period of at least about 30 minutes, and
   from about 0.30% to about 5.00% of the composition of claim 3 based on the dry weight of the cement.

10. A cement slurry including:
    the cement composition of claim 4,
    the composition of claim 1 being present in an amount effective to provide a thickening time of the order of at least about 3 hours at cementing depth.

11. A cement slurry including:
    the cement composition of claim 5, and
    the composition of claim 2 being present in an amount effective to provide a thickening time of the order of at least about 3 hours at cementing depth.

12. A cement slurry including:
    the cement composition of claim 6, and
    the composition of claim 3 being present in an amount effective to provide a thickening time of the order of at least about 3 hours at cementing depth.

13. A cement slurry including:
    the cement composition of claim 7, and
    the composition of claim 1 being present in an amount effective to provide a thickening time of the order of at least about 3 hours at cementing depth.

14. A cement slurry including:
    the cement composition of claim 8, and
    the composition of claim 2 being present in an amount effective to provide a thickening time of the order of at least about 3 hours cementing depth.

15. A cement slurry including:
    the cement composition of claim 9, and
    the composition of claim 3 being present in an amount effective to provide a thickening time of the order of at least about 3 hours at cementing depth.

References Cited
UNITED STATES PATENTS

| | | | |
|---|---|---|---|
| 2,672,424 | 3/1954 | Avery | 106—90 |
| 2,522,707 | 9/1950 | Fabes et al. | 106—90 |
| 2,880,102 | 3/1959 | Woodard et al. | 106—90 |
| 3,215,548 | 11/1965 | Vollick | 106—90 |

JAMES E. POER, Primary Examiner

U.S. C. X.R.

106—111, 315

UNITED STATES PATENT OFFICE
CERTIFICATE OF CORRECTION

Patent No. 3,723,145                   Dated   March 27, 1973

Inventor(s) Walter J. Haldas and Jesse A. Faust

It is certified that error appears in the above-identified patent and that said Letters Patent are hereby corrected as shown below:

Column 1, line 45, delete "slury" and insert -- slurry --.

Column 2, line 43, delete "an" and insert -- and --.

Columns 5 and 6, delete the underscoring line below the line beginning "[Thickening" and insert an underscoring line below the line beginning -- calcium lignosulfonate --.

Columns 5 and 6, Table I, API Casing Schedules, on the line beginning "0.60" delete the minus sign before -- (12) 3:45 --

Columns 5 and 6, Table I, API Squeeze Schedules, on the line beginning "0.60" delete the number "2:25" and insert -- 2:35 --.

Columns 5 and 6, Table I, API Squeeze Schedules, on the line beginning "1.60" delete the number "6:4_" and insert -- 6:45 --.

Column 5, line 71, delete "soidum" and insert -- sodium --.

Column 8, line 46, insert an underscoring line below the line beginning "mix water]".

Column 9, line 16, delete "sit" and insert -- site --.

Column 9, line 29, delete "diclosure" and insert -- disclosure --.

Signed and sealed this 4th day of December 1973.

(SEAL)
Attest:

EDWARD M. FLETCHER, JR.          RENE D. TEGTMEYER